United States Patent [19]

Fiedler et al.

[11] Patent Number: 4,927,059

[45] Date of Patent: May 22, 1990

[54] DEVICE FOR DISPENSING A MULTICOMPONENT FLOWABLE SUBSTANCE

[75] Inventors: Juergen Fiedler, Nettetal; Albert Stoeffler; Michael Bergmann, both of Duesseldorf, all of Fed. Rep. of Germany

[73] Assignee: Henkel Kommanditgesellschaft auf Aktien, Duesseldorf, Fed. Rep. of Germany

[21] Appl. No.: 279,480

[22] Filed: Dec. 2, 1988

[30] Foreign Application Priority Data

Dec. 4, 1987 [DE] Fed. Rep. of Germany ....... 3741087

[51] Int. Cl.[5] ......................... B67D 5/52; B67D 5/60; G01F 11/02

[52] U.S. Cl. .................................... 222/136; 222/145; 222/383

[58] Field of Search ................. 222/94, 145, 383, 498, 222/391, 135, 136, 380, 386, 387, 207, 209, 212

[56] References Cited

U.S. PATENT DOCUMENTS

| | | | |
|---|---|---|---|
| 2,935,231 | 5/1960 | Paull et al. | 222/94 |
| 3,741,447 | 6/1973 | Miles et al. | 222/498 X |
| 3,933,271 | 1/1976 | McGhie | 222/498 X |
| 4,301,948 | 11/1981 | Czech et al. | 222/341 |
| 4,461,403 | 7/1984 | Prahs | 222/129 |
| 4,515,298 | 5/1985 | Czech | 222/383 X |
| 4,775,080 | 10/1988 | Mettenbrink | 222/391 |

FOREIGN PATENT DOCUMENTS

| | | | |
|---|---|---|---|
| 2141436 | 3/1972 | Fed. Rep. of Germany | 222/94 |
| 2594419 | 8/1987 | France . | |

*Primary Examiner*—Kevin P. Shaver

*Attorney, Agent, or Firm*—Ernest G. Szoke; Wayne C. Jaeschke

[57] ABSTRACT

A device for dispensing a striped mixture of two components of a paste-like flowable substance includes a lower container in which one of the components is retained. A dosing unit mounted on the container, includes a pushbutton which is depressed for forcing the first component from the container through a set of valves into a compartment of the dosing unit, through a centrally located tubular element within the compartment, and out of an upper outlet for dispensement from the device. The interior of the compartment between the tubular element is filled with a second component, which is forced upward by the first component entering the compartment, and into the tubular element via openings therethrough, for mixing with the first component as it moves through the tubular element and out of the outlet, for dispensing a striped mixture of the first and second components. The combination of the compartment and tubular element are replaceable as a module on the dosing unit, for selectively providing different second components for striping with the first component.

4 Claims, 1 Drawing Sheet

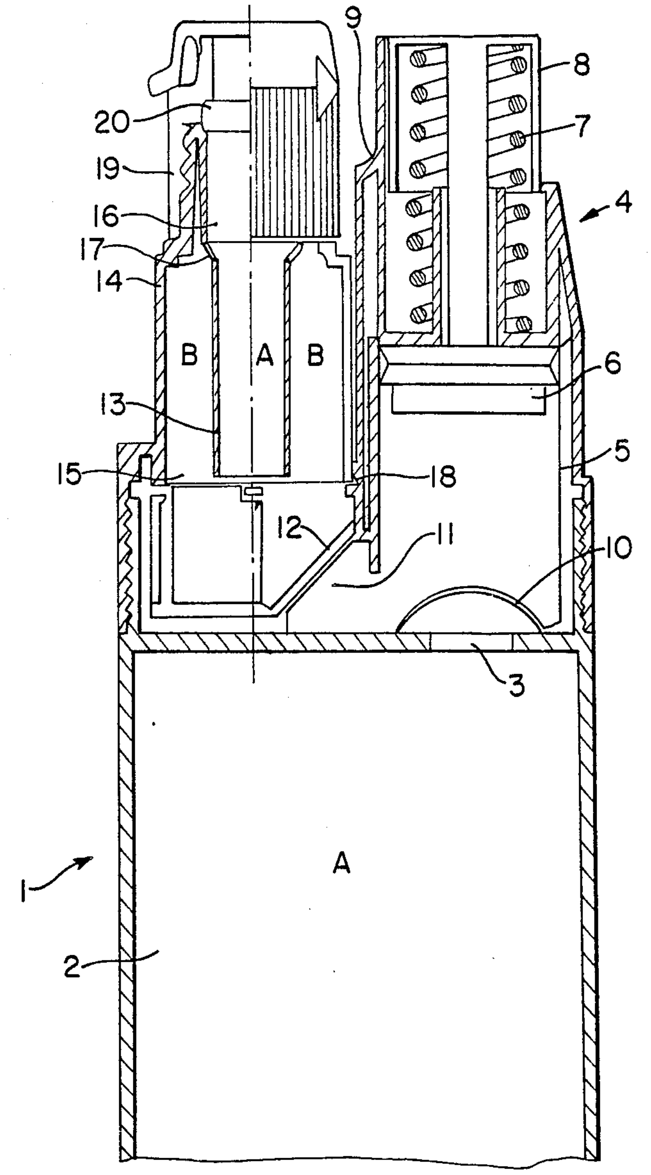
9
8
7
4
20
19
16
17
14
B
A
B
6
13
5
15
18
12
11
10
3
A
1
2

DEVICE FOR DISPENSING A MULTICOMPONENT FLOWABLE SUBSTANCE

BACKGROUND

1. Field of the Invention

This invention relates to a device for selectively dispensing a flowable substance, and more particularly to such devices for dispensing toothpaste.

2. Discussion of Related Art

A device of this type is known, for example, for the dispensing of toothpaste. In this known device, the toothpaste in the container is pumped out by the repeated depression of a plunger of a dosing unit.

A device such as this is much easier to handle than, for example, conventional toothpaste tubes, particularly if some of the toothpaste has already been used. The user merely has to take a hold of the container of the device and actuate the plunger with a finger.

However, the disadvantage of the known device is that it can only dispense one-component substances. Thus, it is not possible for example to dispense a striped toothpaste with this known device.

This possibility has hitherto existed with toothpaste tubes designed in such a way that a small tube projects from the tube opening into the tube, being provided at its end facing the tube opening with several smaller openings. Around the small tube, a striping paste is accommodated in the tube while the basic paste is accommodated in the remaining, larger part of the tube, with the free end of the small tube projecting into the basic paste. Under the effect of external pressure applied to the tube, the basic paste is forced through the small tube and against the striping paste and, under the effect of the pressure thus applied to the striping paste, the striping paste passes through the openings together with the basic cream so that a striped toothpaste emerges from the opening of the tube.

SUMMARY OF THE INVENTION

One object of the present invention is to provide an improved dispenser for selectively dispensing a two-component flowable substance in striped form therefrom.

According to the invention, this object is achieved with a device comprising a container and a dosing unit which communicates therewith through a valve flap, the dosing unit including a manually operable spring-actuated plunger guided in a cylinder with an outlet opening closeable by a second valve flap. The dosing unit is followed at the outlet opening by a tubular, widening element, which is surrounded by a concentric compartment open towards the valve flap for accommodating a second flowable substance, more especially a striping paste, several openings to the compartment being provided in the region of the widening of the tubular element. This easily operated device permits a two-component flowable substance to be selectively dispensed in striped form.

The operation of the device is further improved by arranging the combination of the tubular element with the surrounding compartment to be parallel to the plunger of the dosing element. In addition, in the preferred embodiment, the tubular element with the surrounding compartment is provided at its free end with a closure having an outlet opening. To remove the two-component flowable substance, it is merely necessary to take hold of the container with one hand and to depress the plunger with a finger of that hand. The other hand may be used, for example, to hold a toothbrush to which the substance removed is applied.

In another particularly advantageous and preferred embodiment of the invention, the tubular element with the surrounding compartment is replaceable. In this way, different substances may be combined with the basic substance accommodated in the container. For example, various active substances may be added to a single toothpaste.

BRIEF DESCRIPTION OF THE DRAWING

The invention is described in more detail in the following with reference to the accompanying schematic drawing, which is a longitudinal section through one example of an embodiment of the invention, and in which like items are shown by the same reference number.

DETAILED DESCRIPTION OF THE INVENTION

A device 1 comprises a container 2 for a first flowable substance, which is shown in the drawing as the basic substance A. However, only the upper part of the container 2 is shown in the drawing. The container 2 is connected to a dosing unit 4 through an eccentric opening 3 at the upper end of the container 2. The dosing unit 4 consists of a plunger 6 which is guided in the cylinder 5, and which is actuated or spring biased by a helical spring 7. The helical spring 7 is supported at one end by a moveable push-button 8 connected to the plunger 6, and at its other end by a headpiece 9 fixedly arranged on the container 2. The opening 3 of the container 2, through which the substance A passes into the dosing unit 4, is closed by a first valve flap 10, which only releases or unseals the opening 3 if a higher pressure prevails in the container 2 than in the cylinder 5.

Another, second valve flap 12 is arranged at an outlet opening 11 of the dosing unit 4, and only releases or unseals opening 11 in the direction leading out of the dosing unit 4.

A tubular, widening element 13, which is surrounded by and concentric with compartment 14, is arranged parallel to the cylinder 5 of the dosing unit 4 above the outlet opening 11. The concentric compartment 14 accommodates a second flowable substance which is shown in the drawing as a striping paste B. Several openings 17 are arranged in the vicinity of a widened upper portion 16 of the tubular element 13, enabling the substance B to pass through from compartment 14 into the tubular element 13. The combination of the tubular element 13 with the concentric compartment 14 is removably inserted into the headpiece 9. Connections 18 between the concentric compartment 14 and the headpiece 9 are sealed off, for example, by a ring seal. A closure 19 with an outlet 20, into which the tubular element 13 opens, is provided above the tubular element 13 and the concentric compartment 14.

The operation of the device according to the invention will now be described. If a product is to be removed from the device 1, the push-button 8 is depressed. As a result, the plunger 6 moves downwards so that the air in the cylinder 5, when the device is used for the first time, escapes from the outlet opening 11 through the tubular element 13 and the outlet 20 via the opening valve flap 12. After the air has been displaced from the cylinder 5, the valve flap 12 closes again and the plunger 6 is moved back into the starting position by the helical spring 7. Under the effect of the reduced pressure in the cylinder 5, the valve flap 10 opens and substance A is drawn from the container 2 into the cylinder 5.

After pressure equalization between the container 2 and the cylinder 5, the valve flap 10 closes again. The cylinder 5 is now filled with substance A. By depressing the push-button 8 again, substance A is pumped out of the cylinder 5 through the outlet opening 11 and the re-opening valve flap 12 by the plunger 6. Substance A then passes both into the tubular element 13, and into the open ends 15 of the concentric compartment 14. A pressure is thus applied to substance B so that substance B escapes from the compartment 14 through the openings 17, and combines or mixes in stripes with substance A flowing through the widened portion 16 of tubular element 13. The now striped two-component substance A, B then emerges and is disposed through the outlet 20.

Through the replaceability of the tubular element 13 with the compartment 14, it is possible to combine various substances B with the basic paste A, in this example. For example, in an alternative embodiment, tubular element 13, and the concentric portion therewith of compartment 14, can be filled only with substance B. In this manner, the various embodiments of the invention provide for selectively filling a device 1 with single or multicomponent flowable substances for dispensing in the manner indicated.

The invention is not confined to the methods and embodiments illustrated in the drawing. Further embodiments are possible without departing from the basic concept of the invention, and the spirit and scope of the appended claims. For example, the tubular element with the compartment need not be arranged parallel to the plunger of the dosing unit, and so forth.

What is claimed is:

1. A device for selectively dispensing a paste-like flowable mixture of first and second components, said device comprising:

a container forming a lower portion of said device, the uppermost portion of said container including an outlet; and a dosing unit mounted upon an uppermost portion of said container, said dosing unit including:

a first valve flap covering said outlet of said container;

a spring-biased plunger mounted and guided within a cylinder, said cylinder including an outlet opening;

a second valve flap surrounding and closing the outside of said outlet opening of said cylinder;

a tubular element located above and proximate to said second valve flap;

a compartment surrounding and concentric with said tubular element, said compartment being open at its lower end facing said second valve flap;

said tubular element having at least one opening provided through its upper portion providing a pathway from said compartment;

said device providing for filling said container with a first component of said flowable substance, and said compartment with a second component of said flowable substance, for dispensing a striped-like combination of said first and second components; and mounting means for providing the combination of said compartment and said tubular element as a replaceable portion of said dosing unit.

2. The device of claim 1, wherein the upper portion of said tubular element is wider than the lower portion.

3. The device of claim 1, wherein the combination of said tubular element and said compartment are arranged parallel to the combination of said plunger within said cylinder.

4. The device of claim 1, wherein said dosing unit further includes a closure covering an outlet from the uppermost portion of the combination of said compartment and tubular element, said closure being moveable for uncovering said outlet for dispensing said flowable substance.

* * * * *